UNITED STATES PATENT OFFICE.

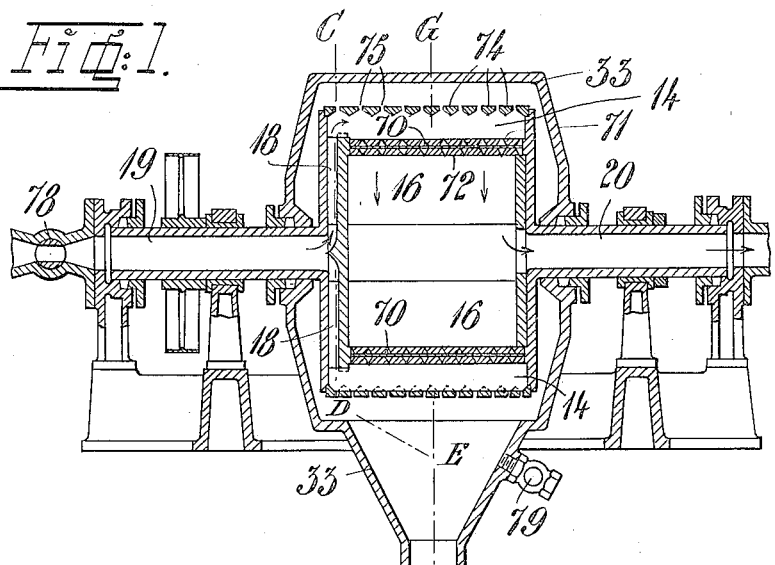
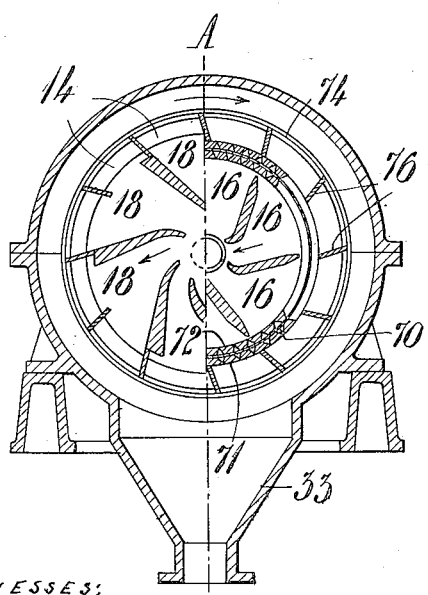
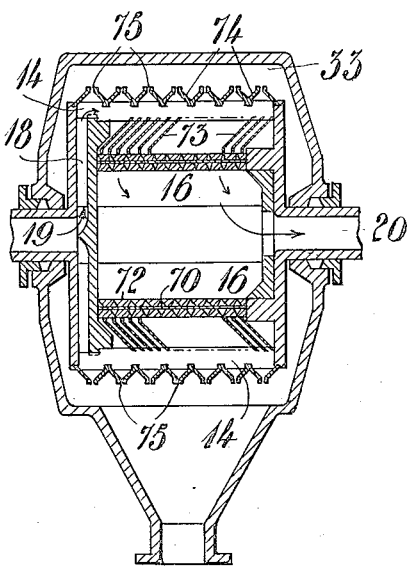

KARL WÅRD AND ALBERT WÅRD, OF STOCKHOLM, SWEDEN.

METHOD AND MEANS FOR SEPARATING PARTICLES FROM A FLUID BY COMBINED CENTRIFUGAL AND FILTERING ACTION.

1,262,146. Specification of Letters Patent. Patented Apr. 9, 1918.

Application filed May 22, 1914, Serial No. 840,202. Renewed October 23, 1917. Serial No. 198,179.

*To all whom it may concern:*

Be it known that we, KARL WÅRD and ALBERT WÅRD, subjects of the King of Sweden, residing at 39 Odengatan, Stockholm, Sweden, have invented new and useful Improvements in Methods and Means for Separating Particles from a Fluid by Combined Centrifugal and Filtering Action, of which the following is a specification.

The present invention has for its object to provide method and means which make it possible to separate from a fluid, especially a liquid, particles suspended therein, not only such that are specifically heavier than the fluid by centrifugal action, but also those which are no heavier or lighter than the fluid, by filtration. Further the invention enables, without stopping the apparatus and without disjoining the same, the filtering layer employed in the apparatus to be easily and rapidly cleaned when it has been more or less obstructed by deposited particles.

With respect to the separation of particles from gases, it may be true that there are no solid or liquid particles which are specifically lighter than gases, but there may be particles which still are so light that they cannot be separated therefrom by centrifugal action. The present invention is well adapted for treating gases, and in this case the filter acts upon such particles as are small and light enough to be carried forth by the inward current of gas, in spite of the centrifugal action, although in reality specifically heavier than the gas.

The portion of the apparatus serving to separate only the specifically heavier particles from a fluid was previously known, for instance by our U. S. Patent No. 1,098,927, and the present invention therefore relates to a method and to other features of the apparatus which enable particles of equal or less specific gravity than the fluid in question to be also separated therefrom by combined centrifugal and filtering action, whereby the said fluid when containing, besides specifically heavier particles, particles of equal or less specific gravity, although occurring in small quantities can be delivered, in a filtered state and thus completely purified from particles.

The apparatus in question is illustrated in the accompanying drawing. Figure 1 shows a longitudinal section through the axis of rotation; Fig. 2, portion to the left of line A—B, a cross section on the line C—D—E—F, and right hand portion a cross section on G—F. Fig. 3 shows a longitudinal section of the apparatus modified in stratifying that so-called alpha plates of a known kind have been introduced in the separating channels outside the filtering layer.

The present apparatus consists partly of the channels referred to hereinafter, partly of a filtering layer arranged at a suitable place in the rotatable member, and partly of a stationary closed receptacle surrounding the said rotatable member and completely filled with fluid. The aforesaid channels in the rotatable member are the same as those referred to in the aforesaid U. S. patent specification, viz. a channel or channels 14 (the separating channels) on their outer end or ends opening into said stationary receptacle 33 while their inner end or ends are bounded by filtering layer 70, channels 18 (the supply channels) leading from the axis of rotation outward and opening into the separating channels 14, and channels 16 (the discharge channels) leading inward from the filtering layer 70. The said filtering layer is therefore arranged between the inner ends of the separating channels 14 and the outer ends of the discharge channels 16.

In order to obtain a small speed of the current of fluid passing inward through the separating channels 14 and a large filtering surface and sufficient space for a great number of stratifying or alpha plates, when such are used, without necessitating the use of a rotating body of large diameter the axial width of the separating channel may be made rather considerable, as shown in the drawing, and may if required be much greater than the length or radial extension of said channels.

Other arrangements regarding the journal boxes 19, 20 and packing boxes are already known, as also is the receptacle 33 to which is added a collecting vessel or the like connected thereto whereby, in a known manner, the separated particles collected in the receptacle 33 and in said collecting vessel may either be removed periodically or conducted off continuously and thus collected outside the apparatus in a highly concentrated state.

Fig. 3 shows a modification of the construction shown in Fig. 1, in that stratifying or so called alpha plates 73 of the usual conical shape are inserted into the inner portion of the separating channels 14, said plates dividing the fluid passing through the separating channels into layers of small radial extension whereby, as known, the separating capacity is increased to a considerable extent.

Figs. 1 and 3 show in a longitudinal section and Fig. 2 partially in a cross section the filtering layer 70 together with supporting plates or gratings on both sides thereof, viz. at 71 on the outer and at 72 on the inner side of the filtering layer. These supporting plates which are suitably perforated serve to retain the filtering layer in its position and to support it when stress due to pressure occurs. The filtering layer 70 may consist of paper, cloth, carbon, unglazed earthenware or other material used for filtration. The supporting plates 71, 72 may vary in construction and may be similar to supporting means previously used in filtering devices. In the drawing, the filter has the shape of a cylindrical drum but it may also be more or less tapering. It may consist for instance of several cylindrical, conical or plane, radially extending rings surrounding the shaft or of a combination of several of these forms. The filtering material may also consist of bands wound in a suitable manner around the inner supporting plate 72 before the outer supporting plate 71 is inserted in the rotatable member which further comprises other suitably arranged parts. Said body can easily be introduced into and removed from the apparatus by suitably dividing the receptacle 33 into two halves or in other manner. The filtering device (taken as a whole) is further provided with suitable packings so as to cause all the fluid passing inward from the separating channels 14 to pass through the filtering layer.

The manner and supplemental devices for performing the present combined centrifugal separation and filtration, and also for performing the cleaning of the filtering layer while the machine is running and without disjoining the same, will now be described.

After the rotatable member has been brought into rotation and the channels and receptacle 33 of the apparatus have been filled, during or after the starting, with a fluid which owing to the centrifugal force of the rotating fluid in the receptacle 33 assumes a counter-pressure greater than the atmospheric, the fluid to be freed from particles suspended therein is introduced through a supply pipe conduit leading from a receptacle, feeding hopper or pump and through a transferring box into the axial channel 19 and therefrom further into the rotatable member, viz. through the supply channels 18 into the separating channels 14. In these channels, as known, the separation of the specifically heavier particles from the fluid takes place, in that the said particles are driven outward by the centrifugal force and thus leave the said rotatable member through the openings 75 of the separating channels and are received or collected in the receptacle 33 while the fluid and the remaining particles therein of equal or less specific gravity which are prevented from escaping into the receptacle 33, are forced inwardly in the direction toward the filtering layer 70 situated between the separating channels 14 and the discharge channels 16. This filtering layer is penetrated by the fluid but not by the remaining particles which are thus compelled to deposit themselves on the outer side of the filtering layer while the fluid thus purified is discharged from the apparatus through the discharge channels 16, the axial channel 20 and the further discharging device.

The particles ejected into the receptacle 33 are removed therefrom in a manner already known in a highly concentrated state and either continuously or intermittently while the apparatus is running and without the same.

The particles deposited on the outside of the filtering layer 70 can easily and rapidly be removed therefrom according to requirements, during the continuous rotation of the rotatable member and without disjoining the apparatus. It is only necessary for this purpose to cause at certain spaces of time and for a short while a current of fluid to pass in the opposite direction, i. e. outward through discharge channels 16 and further through the filtering layer 70 and the separating channels 14 into the receptacle 33. This can be done for instance by wholly or partially closing the supply of fluid by means of a valve 78 placed on the above named supply pipe, and by simultaneously letting out a suitable quantity of fluid from the receptacle 33, by means of a valve 79, placed on said receptacle. This occasional reverse flow of cleaned fluid, caused by centrifugal force and supplied from the discharge channels 16 and from the rest of the discharge passage, then passes into the receptacles 33 and replaces the quantity of fluid discharged by said valve 79, therewith loosening from the filtering layer 70 the particles precipitated on the outer side thereof, and carrying themselves into said receptacle 33. After the filtering layer has thus been rapidly cleaned, the valves 78 and 79 are restored to their normal positions and the combined centrifugal and filtering action can be continued as before. The said cleaning of the filtering layer can also be effected without the use of the valve 78, by arranging a suitable reversing valve in the discharge conduit whereby for a suitable period, simultaneously with the opening of the valve 79, a quantity of pure cleaned fluid can be led in the opposite direction through the axial channel 20, the discharge channels 16, the filtering layer and the separating channels to the receptacle 33 which thus also in this case will receive the loosened particles.

As no current of fluid from the receptacle 33 into the channels of the rotatable member occurs, but in certain cases a continuous but slow outward current of fluid may be effected, none of the particles thus received in the receptacle 33 can again enter into the channels of the rotatable member during its rotation.

A particular advantage of an apparatus arranged in the manner described is that the filtering layer is not liable to be obstructed by other particles than the comparatively few ones which cannot be separated off directly by the centrifugal force in the separating channels 14 or in the spaces between the stratifying or alpha plates when such ones are inserted in said channels. As a consequence, including also another great advantage, the filtering layer is not so frequently obstructed and needs cleaning less often than if filtration of specifically heavier as well as lighter particles were carried on without the separation thereof by centrifugal force. The cleaning of the filtering layer thus only needs to be performed at rather long intervals, and this can easily be made automatically by means of known, simple mechanical devices.

The principal advantages of this apparatus, however, as already mentioned, are that the particles precipitated on the filtering layer can be loosened therefrom and carried into the receptacle 33, and, that the particles collected in said receptacle can be removed therefrom while the apparatus is running and without disjoining the same. In all similar apparatus, previously known, it is necessary to stop the apparatus and disjoin the same, when it is desired to clean the interior of the rotating drum. In the present apparatus, on the contrary, the cleaning of the filtering layer 70 and the removing of the separated particles collected in the receptacle 33 can be easily performed and also automatically, if desired, while the apparatus is running and without disjoining the same.

Other structural devices shown in the drawing, as the exchangeable protecting rings 74, the suitably dimensioned spaces between which are forming the outlet openings 75 of the separating channels, and the partitions 76 arranged in a suitable number in the separating channels for causing the fluid therein to partake uniformly and completely in the rotation, are previously known and employed.

Having now particularly described the nature of our invention and the manner of its operation, what we claim is:

1. A method of separating suspended solid particles from a fluid by centrifugal and filtering action, consisting in conducting the fluid through a determined path surrounded by a body of fluid, rotating the fluid in said path to compress the surrounding body of fluid and to impart sufficient centrifugal force to those solid particles of greater specific gravity than the fluid only to throw them off through the said body of fluid, conducting the fluid and remaining solid particles contained therein inward with respect to the axis of rotation of the fluid, and filtering the inwardly moving fluid to separate the said remaining particles.

2. A method of separating suspended solid particles from a fluid by centrifugal and filtering action, consisting in conducting the fluid through a determined path surrounded by a body of fluid, rotating the fluid in said path to impart sufficient centrifugal force to the solid particles of greater specific gravity than the fluid to throw them off from the said path into the body of fluid, conducting the fluid and remaining solid particles contained therein inward with respect to the axis of rotation of the fluid, filtering the inwardly moving fluid to separate the said remaining particles, and at certain spaces of time reversing the flow of the fluid through the rotating path for cleaning purposes.

3. A method of separating suspended solid particles from a fluid by centrifugal and filtering action, consisting in conducting the fluid through a determined path surrounded by a body of fluid inclosed in a stationary, closed receptacle and filling the same, rotating the said fluid path to impart sufficient centrifugal force to the solid particles of greater specific gravity than the fluid to throw them off from the said path into the body of fluid, conducting the fluid and remaining solid particles contained therein inward with respect to the axis of rotation of the fluid path through a filtering medium to separate the said remaining particles, and at certain spaces of time reversing the flow of the fluid through the filtering medium and rotating path to remove the separated particles from the filtering medium and discharge the same through the stationary receptacle.

4. A method of separating suspended solid particles from a fluid by centrifugal and filtering action, consisting in conducting the fluid through a determined path surrounded by a body of fluid inclosed in and filling a stationary, closed receptacle having a valved outlet, rotating the said fluid path to impart sufficient centrifugal force to the solid particles of greater specific gravity than the fluid to throw them off from the said path into the body of fluid, conducting the fluid and remaining solid particles contained therein inward with respect to the axis of rotation of the fluid path through a filtering medium to separate the said remaining particles, and at certain spaces of time reversing the flow, of the fluid through the filtering medium and rotating path for cleaning purposes by cutting off the supply of fluid to the said path and opening the outlet of the said stationary receptacle.

5. A device for separating suspended solid particles from a fluid by centrifugal and filtering action, comprising a stationary, closed receptacle adapted to contain a body of fluid, a member rotatable in the receptacle and provided with substantially radial separating channels in its outer part and with substantially radial supply channels leading into said separating channels, means for supplying fluid to the inner ends of the supply channels, the rotatable member being provided with discharge channels disposed inwardly of the separating channels, and a filtering layer covering the inlet ends of the discharge channels and interposed between the same and the separating channels.

6. A device for separating suspended solid particles from a fluid by centrifugal and filtering action, comprising a stationary, closed receptacle having a cleaning outlet, a member rotatable in the receptacle and provided with substantially radial separating channels in its outer part and with substantially radial supply channels leading into said separating channels, means for supplying fluid to the inner ends of the supply channels, the rotatable member being provided with discharge channels disposed inwardly of the separating channels, a filtering layer covering the inlet ends of the discharge channels and interposed between the same and the separating channels, and means by which the flow of fluid through the filtering layer and discharge and separating channels of the rotatable member may be reversed for cleaning purposes.

7. A device for separating suspended solid particles from a fluid by centrifugal and filtering action, comprising a stationary, closed receptacle, a valved outlet for the said receptacle, a member rotatable in the receptacle and provided with substantially radial separating channels in its outer part and with substantially radial supply channels leading into said separating channels, valve-controlled means for supplying fluid to the inner ends of the supply channels, the rotatable member being provided with discharge channels disposed inwardly of the separating channels, and a filtering layer covering the inlet ends of the discharge channels and interposed between the same and the separating channels.

8. A device for combined centrifugal and filtering action upon a fluid, comprising a stationary receptacle, a member rotatable therein and provided with outer separating channels and supply channels at one side leading into said separating channels, valve-controlled means for supplying fluid to said channels through the axis of said rotatable member, said rotatable member being provided with discharge channels inwardly of said separating channels, all of said channels being disposed around a common axis, the interior of the receptacle being in communication with the separating channels, radial deflectors in said separating channels, and a filtering layer covering the discharge channels at the inlet ends thereof and interposed between same and the separating channels so as to filter all of such particles from the fluid as are of the same or less specific gravity, said member when rotated causing the outward escape of the particles of greater specific gravity than the fluid by centrifugal force through the separating channels and into the receptacle for removal therefrom.

In testimony whereof we have signed our names to this specification in the presence of two subscribing witnesses.

KARL WÅRD.
ALBERT WÅRD.

Witnesses:
BIRGER NORDFELDT,
HILMA TCLANDER.